(12) United States Patent
Greenfield

(10) Patent No.: US 9,119,390 B1
(45) Date of Patent: Sep. 1, 2015

(54) CAGED RODENT TRAP ASSEMBLY

(71) Applicant: Scott A. Greenfield, West Fairview, PA (US)

(72) Inventor: Scott A. Greenfield, West Fairview, PA (US)

( * ) Notice: Subject to any disclaimer, the term of this patent is extended or adjusted under 35 U.S.C. 154(b) by 128 days.

(21) Appl. No.: 13/965,325

(22) Filed: Aug. 13, 2013

(51) Int. Cl.
*A01M 23/30* (2006.01)
*A01M 23/24* (2006.01)

(52) U.S. Cl.
CPC ............ *A01M 23/245* (2013.01); *A01M 23/30* (2013.01)

(58) Field of Classification Search
CPC .... A01M 23/24; A01M 23/245; A01M 23/30
USPC ........................................ 43/81, 81.5, 82, 96
See application file for complete search history.

(56) References Cited

U.S. PATENT DOCUMENTS

| | | | | |
|---|---|---|---|---|
| 491,329 | A * | 2/1893 | Andrews | 43/81 |
| 528,671 | A * | 11/1894 | Hooker | 43/81 |
| 1,456,981 | A * | 5/1923 | Goss | 43/81 |
| 2,175,754 | A * | 10/1939 | Harrison | 43/58 |
| 2,188,297 | A * | 1/1940 | Graybill | 43/81 |
| 2,869,280 | A | 1/1959 | Dobratz | |
| 4,212,128 | A * | 7/1980 | Vance | 43/81 |
| 4,569,149 | A | 2/1986 | Sensing et al. | |
| 4,633,610 | A | 1/1987 | Thompson | |
| 4,703,583 | A | 11/1987 | Dzurkovich et al. | |
| 4,887,381 | A | 12/1989 | Tieben | |
| D323,016 | S | 1/1992 | Vajs | |
| D335,324 | S | 5/1993 | Burris et al. | |
| 7,231,738 | B2 | 6/2007 | Watson et al. | |
| 2005/0279015 | A1 | 12/2005 | Hall | |

\* cited by examiner

*Primary Examiner* — Rob Swiatek
*Assistant Examiner* — Danielle Clerkley

(57) ABSTRACT

A caged rodent trap assembly catches a rodent by placing bait within a cage to make it harder for the rodent to escape. The assembly includes a platform. A jaw is pivotally coupled to the platform and pivotable between an open position and a closed position. A biasing member is coupled to the jaw and configured to bias the jaw toward a front edge of the platform such that the jaw is forced downwardly against an animal to be caught. A hold-down bar is mechanically coupled to the jaw and configured to retain the jaw in the open position. A trigger plate is positioned above the top surface and configured for receiving bait thereon. The jaw is pivoted onto the animal when pressure is applied to the trigger plate. A cage is coupled to the trigger plate and configured to inhibit the animal's access to the bait.

12 Claims, 4 Drawing Sheets

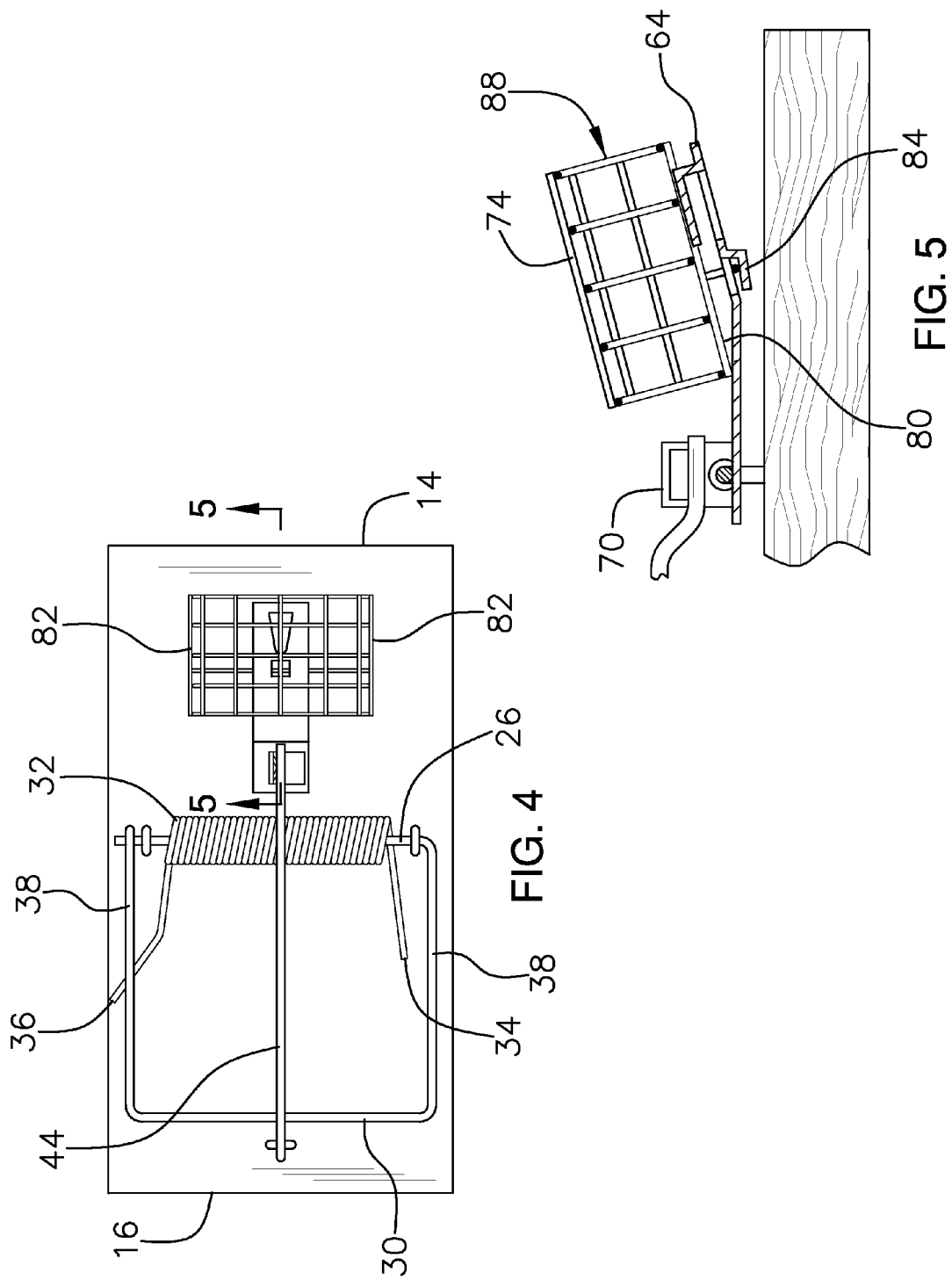

CAGED RODENT TRAP ASSEMBLY

BACKGROUND OF THE DISCLOSURE

Field of the Disclosure

The disclosure relates to rodent trap assemblies and more particularly pertains to a new rodent trap assembly for catching a rodent by placing bait within a cage to make it harder for the rodent to escape.

SUMMARY OF THE DISCLOSURE

An embodiment of the disclosure meets the needs presented above by generally comprising a platform. A jaw is pivotally coupled to the platform and pivotable between an open position and a closed position. A biasing member is coupled to the jaw and configured to bias the jaw toward a front edge of the platform such that the jaw is forced downwardly against an animal to be caught. A hold-down bar is mechanically coupled to the jaw and configured to retain the jaw in the open position. A trigger plate is positioned above the top surface and configured for receiving bait thereon. The jaw is pivoted onto the animal when pressure is applied to the trigger plate. A cage is coupled to the trigger plate and configured to inhibit the animal's access to the bait.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a top view of an embodiment of the disclosure.

FIG. 5 is a cross-sectional view of an embodiment of the disclosure taken along line 5-5 of FIG. 4.

DESCRIPTION OF THE PREFERRED EMBODIMENT

Figure 1:
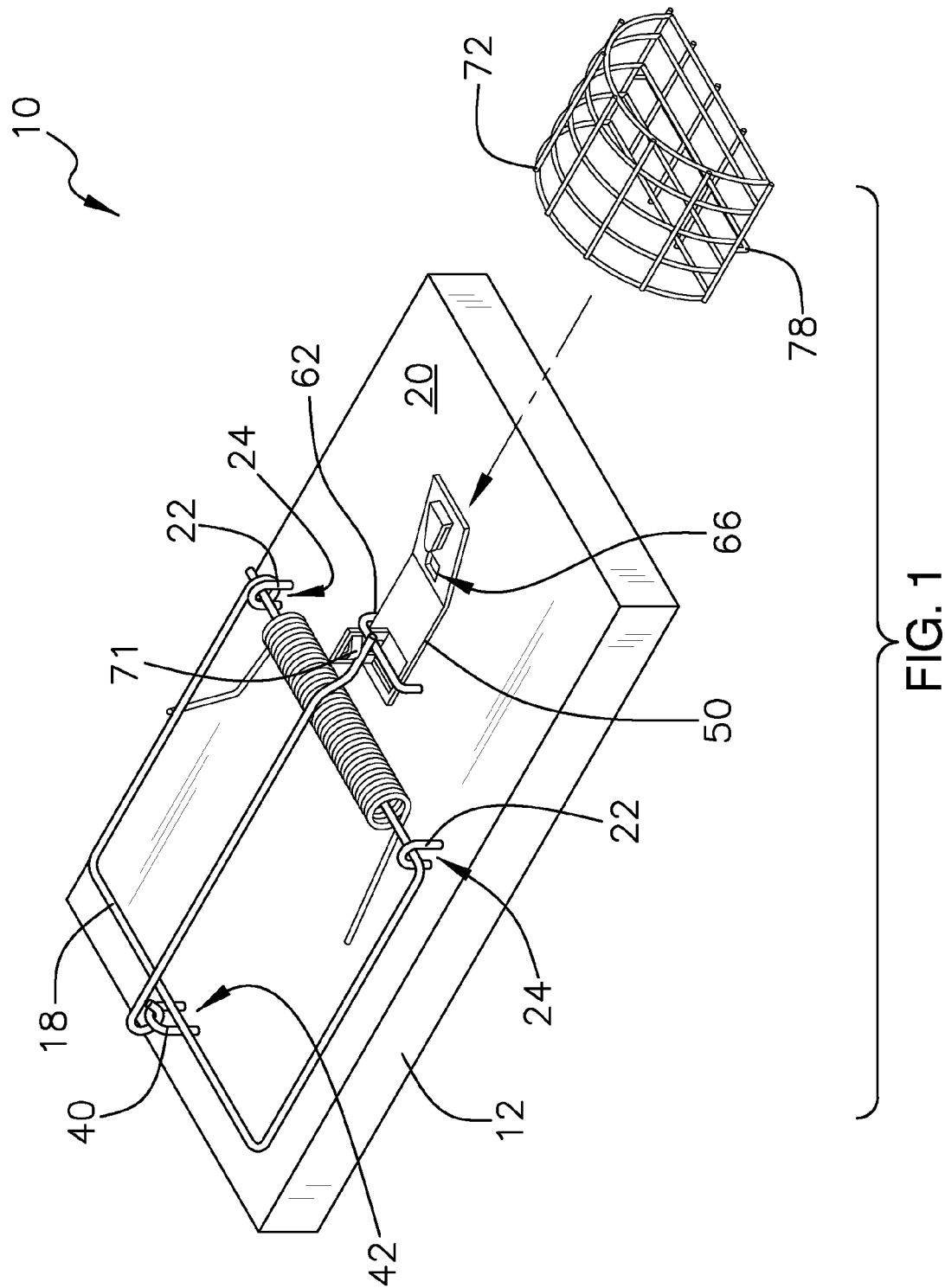
FIG. 1 is a top front side perspective view of a caged rodent trap assembly according to an embodiment of the disclosure.
Figure 2:
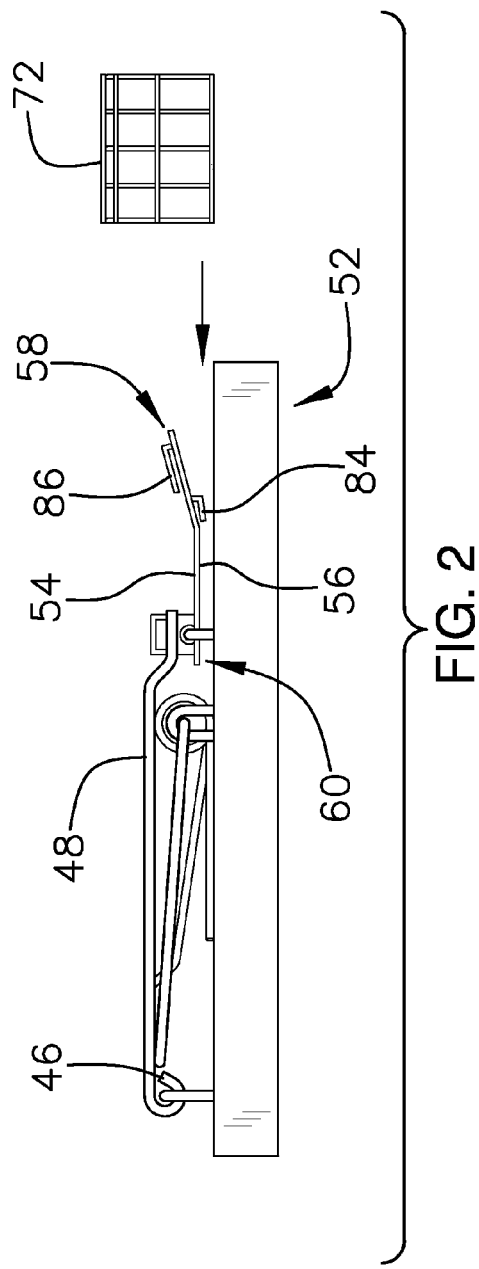
FIG. 2 is a side view of an embodiment of the disclosure.
Figure 3:
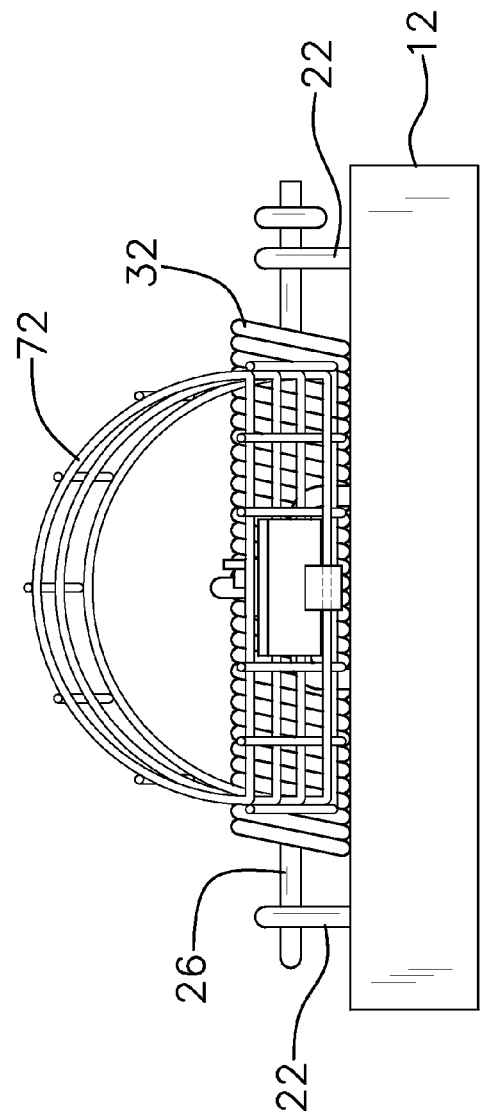
FIG. 3 is a front view of an embodiment of the disclosure.
Figure 6:
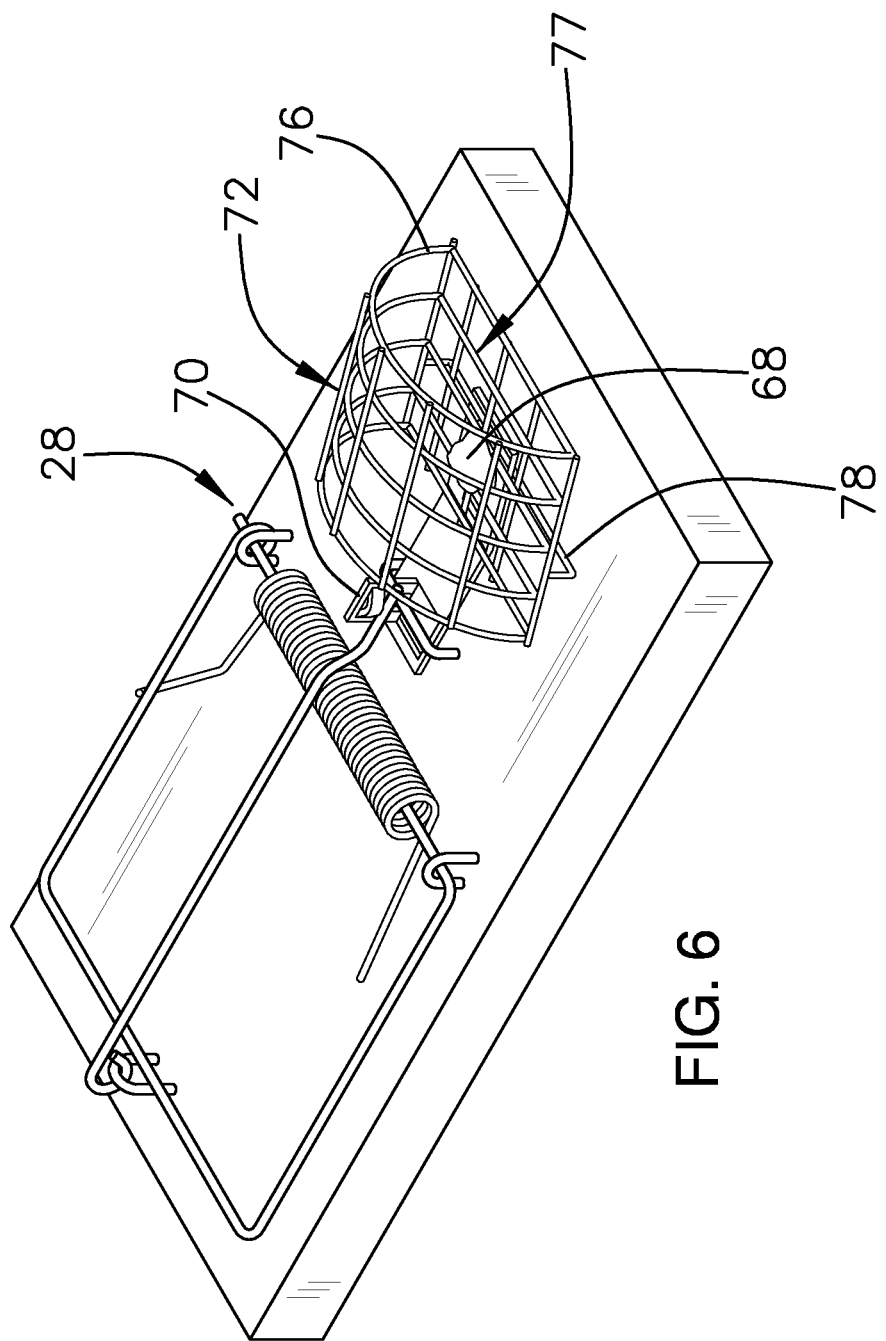
FIG. 6 is a top front side perspective view of an embodiment of the disclosure similar to FIG. 1, except that FIG. 6 shows the cage attached to the trigger plate.

With reference now to the drawings, and in particular to FIGS. 1 through 6 thereof, a new rodent trap assembly embodying the principles and concepts of an embodiment of the disclosure and generally designated by the reference numeral 10 will be described.

As best illustrated in FIGS. 1 through 6, the caged rodent trap assembly 10 generally comprises a platform 12 having a front edge 14 and a back edge 16. A jaw 18 is coupled to the platform 12 and may be arranged into a substantially square shape on a top surface 20 of the platform 12. A pair of first couplers 22 extends upwardly from the top surface 20 of the platform 12. The first couplers 22 and the top surface 20 of the platform 12 form a first receiving slot 24 through which a front end 26 of the jaw 18 is inserted. The first couplers 22 hingedly couple the jaw 18 to the platform 12 such that the jaw 18 is pivotable between an open position 28 and a closed position. A rear end 30 of the jaw 18 is positioned proximate the back edge 16 of the platform 12 when the jaw 18 is in the open position 28.

A biasing member 32 is coupled to the jaw 18. The biasing member 32 is configured to bias the jaw 18 toward the front edge 14 of the platform 12 such that the jaw 18 is forced downwardly against an animal to be caught. The rear end 30 of the jaw 18 passes over the biasing member 32 toward the front edge 14 of the platform 12 when the jaw 18 is moved to the closed position. The biasing member 32 has a first end 34 and a second end 36 each extending outwardly toward lateral sides 38 of the jaw 18. The second end 36 of the biasing member 32 extends underneath an associated one of the lateral sides 38 of the jaw 18. The biasing member 32 may be arranged in a coiled manner and may extend laterally across the platform 12.

A second coupler 40 extends upwardly from the top surface 20 of the platform 12. The second coupler 40 and the top surface 20 of the platform 12 form a second receiving slot 42. A hold-down bar 44 is mechanically coupled to the jaw 18. The first end 46 of the hold-down bar 44 may be arcuate and is inserted into the second receiving slot 42. A main portion 48 of the hold-down bar 44 extends over and abuts the biasing member 32 when the jaw 18 is in the open position 28.

A trigger plate 50 is mechanically coupled to the jaw 18. The trigger plate 50 is positioned above the top surface 20 of the platform 12 and may be centrally positioned above a front portion 52 of the platform 12. The trigger plate 50 has a top side 54, a bottom side 56, a front section 58 and a rear section 60. The hold-down bar 44 retains the jaw 18 in the open position 28 when the second end 62 of the hold-down bar 44 is secured to the trigger plate 50. The rear section 60 is orientated parallel relative to the top surface 20 of the platform 12. The front section 58 has a distal edge 64 with respect to the rear section 60 slanting upwardly and outwardly relative to the rear section 60. An aperture 66 in the trigger plate 50 is configured to receive a piece of bait 68 thereon such that the jaw 18 is pivoted to the closed position and onto the animal seeking the bait 68 when pressure is applied to the trigger plate 50. A catch plate 70 extends upwardly from the trigger plate 50. The catch plate 70 is mechanically coupled to the hold-down bar 44 wherein pressure applied to the trigger plate 50 selectively engages a tab 71 of the hold-down bar 44 and pivots the jaw 18 into the closed position.

A cage 72 is removably coupled to the trigger plate 50. The cage 72 is configured to pivot the jaw 18 to the closed position when pressure applied to the cage 72 is transferred to the trigger plate 50. A top 74 of the cage 72 may be convexly arcuate. A front edge 76 of the cage 72 provides an access opening into an interior 77 of the cage 72. The cage 72 is positionable over the aperture 66 wherein the cage 72 is configured to inhibit the animal's access to bait 68 positioned on the aperture 66 when the cage 72 is coupled to the trigger plate 50. The cage 72 may be comprised of a flexible mesh material and thus may provide a cage 72 that is lightweight. A rod 78 projects downwardly from the bottom 80 of the cage 72. The rod 78 extends between lateral edges 82 of the cage 72. A clip 84 is coupled to the bottom side 56 of the trigger plate 50 and is configured to selectively engage the rod 78 to releasably couple the cage 72 to the trigger plate 50.

A projection 86 is coupled to the top side 54 of the trigger plate 50. The projection 86 is horizontally orientated and spaced relative to the front section 58 of the trigger plate 50. The projection 86 is configured to support a front portion 88 of the cage 72 wherein the bottom 80 of the cage 72 is orientated parallel with respect to the front section 58 of the trigger plate 50 such that the cage 72 slants upwardly relative to the top surface 20 of the platform 12.

The platform 12 may be constructed from wood or like material. Each of the jaw 18 and the biasing member 32 may be constructed from metal or like material. The biasing member 32 is of sufficient force to swing the jaw 18 violently against the animal to be caught. The assembly 10 may have a height between approximately 0.2 centimeters and 15 centimeters; a length between approximately 5.0 centimeters and 20.0 centimeters; and a width between approximately 5.0 centimeters and 15.0 centimeters.

In use, as stated above and shown in the Figures, bait 68, such as cheese, peanut butter or the like, is placed on the aperture 66 of the trigger plate 50. The cage 72 is attached to the trigger plate using clip 84. The second end 62 of the hold-down bar 44 is secured to the trigger plate 50 to retain the jaw 18 in the open position 28. When an animal attempts to snatch the bait 68, the animal must enter through the front edge 76 of the cage 72. When pressure is applied to the trigger plate 50, the jaw 18 is pivoted to the closed position and kills the animal positioned in its path.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A caged rodent trap assembly comprising:
   a platform;
   a jaw coupled to said platform, said jaw being pivotally coupled to said platform such that said jaw is pivotable between an open position and a closed position;
   a biasing member coupled to said jaw, said biasing member being configured to bias said jaw toward a front edge of said platform such that said jaw is forced downwardly against an animal to be caught;
   a hold-down bar being mechanically coupled to said jaw and being configured to retain said jaw in the open position;
   a trigger plate mechanically coupled to said jaw, said trigger plate being configured for receiving bait thereon such that said jaw is pivoted to the closed position and onto the animal to be caught when pressure is applied to said trigger plate;
   a cage coupled to said trigger plate, said cage being configured to inhibit the animal's access to bait positioned on said trigger plate, said cage being removably coupled to said trigger plate;
   a rod projecting downwardly from a bottom of said cage, said rod extending between lateral edges of said cage; and
   a clip coupled to a bottom side of said trigger plate, said clip being configured to selectively engage said rod to releasably couple said cage to said trigger plate.

2. The assembly of claim 1, further comprising a pair of first couplers extending upwardly from a top surface of said platform, said first couplers and said top surface of said platform forming a first receiving slot through which a front end of said jaw is inserted, said first couplers hingedly coupling said jaw to said platform.

3. The assembly of claim 1, further comprising a rear end of said jaw passing over said biasing member toward said front edge of said platform when said jaw is moved to the closed position, said biasing member having a first end and a second end each extending outwardly toward lateral sides of said jaw, said second end of said biasing member extending underneath an associated one of said lateral sides of said jaw.

4. The assembly of claim 1, further comprising:
   a second coupler extending upwardly from a top surface of said platform, said second coupler and said top surface of said platform forming a second receiving slot; and
   a first end of said hold-down bar being arcuate and being inserted into said second receiving slot, said hold-down bar having a main portion extending over and abutting said biasing member when said jaw is in the open position.

5. The assembly of claim 1, further comprising said trigger plate having a front section and a rear section, said rear section being orientated parallel relative to a top surface of said platform, said front section having a distal edge with respect to said rear section slanting upwardly and outwardly relative to said rear section.

6. The assembly of claim 1, further comprising said trigger plate having an aperture thereon wherein said aperture is configured to receive the bait.

7. The assembly of claim 1, further comprising a catch plate extending upwardly from said trigger plate, said catch plate being mechanically coupled to said hold-down bar wherein pressure applied to said trigger plate selectively engages a tab of said hold-down bar and pivots said jaw into the closed position.

8. The assembly of claim 6, further comprising a front edge of said cage providing an access opening into an interior of said cage, said cage being positionable over said aperture wherein said cage is configured to inhibit the animal's access to bait positioned on said aperture when said cage is coupled to said trigger plate.

9. The assembly of claim 1, further comprising a top of said cage being convexly arcuate.

10. The assembly of claim 1, further comprising said cage being comprised of a flexible mesh material.

11. The assembly of claim 5, further comprising a projection coupled to a top side of said trigger plate, said projection being horizontally orientated and spaced relative to said front section of said trigger plate, said projection being configured to support a front portion of said cage wherein a bottom of said cage is orientated parallel with respect to said front section of said trigger plate such that said cage slants upwardly relative to said top surface of said platform.

12. A caged rodent trap assembly comprising:
   a platform having a front edge and a back edge;
   a jaw coupled to said platform, said jaw being arranged into a substantially square shape on a top surface of said platform;

a pair of first couplers extending upwardly from said top surface of said platform, said first couplers and said top surface of said platform forming a first receiving slot through which a front end of said jaw is inserted, said first couplers hingedly coupling said jaw to said platform such that said jaw is pivotable between an open position and a closed position, a rear end of said jaw being positioned proximate said back edge of said platform when said jaw is in the open position;

a biasing member coupled to said jaw, said biasing member being configured to bias said jaw toward said front edge of said platform such that said jaw is forced downwardly against an animal to be caught, said rear end of said jaw passing over said biasing member toward said front edge of said platform when said jaw is moved to the closed position, said biasing member having a first end and a second end each extending outwardly toward lateral sides of said jaw, said second end of said biasing member extending underneath an associated one of said lateral sides of said jaw, said biasing member being arranged in a coiled manner and extending laterally across said platform;

a second coupler extending upwardly from said top surface of said platform, said second coupler and said top surface of said platform forming a second receiving slot;

a hold-down bar being mechanically coupled to said jaw, a first end of said hold-down bar being arcuate and being inserted into said second receiving slot, said hold-down bar having a main portion extending over and abutting said biasing member when said jaw is in the open position;

a trigger plate mechanically coupled to said jaw wherein said hold-down bar retains said jaw in the open position when a second end of said hold-down bar is secured to said trigger plate, said trigger plate being positioned above said top surface of said platform and being centrally positioned above a front portion of said platform, said trigger plate having a top side, a bottom side, a front section and a rear section, said rear section being positioned proximate a second end of said hold-down bar, said rear section being orientated parallel relative to said top surface of said platform, said front section having a distal edge with respect to said rear section slanting upwardly and outwardly relative to said rear section, an aperture in said trigger plate being configured to receive a piece of bait thereon such that said jaw is pivoted to the closed position and onto the animal seeking the bait when pressure is applied to said trigger plate;

a catch plate extending upwardly from said trigger plate, said catch plate being mechanically coupled to said hold-down bar wherein pressure applied to said trigger plate selectively engages a tab of said hold-down bar and pivots said jaw into the closed position;

a cage being removably coupled to said trigger plate, said cage being configured to pivot said jaw to the closed position when pressure applied to said cage is transferred to said trigger plate, a top of said cage being convexly arcuate, a front edge of said cage providing an access opening into an interior of said cage, said cage being positionable over said aperture wherein said cage is configured to inhibit the animal's access to bait positioned on said aperture when said cage is coupled to said trigger plate, said cage being comprised of a flexible mesh material;

a projection coupled to said top side of said trigger plate, said projection being horizontally orientated and spaced relative to said front section of said trigger plate, said projection being configured to support a front portion of said cage wherein a bottom of said cage is orientated parallel with respect to said front section of said trigger plate such that said cage slants upwardly relative to said top surface of said platform;

a rod projecting downwardly from said bottom of said cage, said rod extending between lateral edges of said cage; and a clip coupled to said bottom side of said trigger plate, said clip being configured to selectively engage said rod to releasably couple said cage to said trigger plate.

* * * * *